…

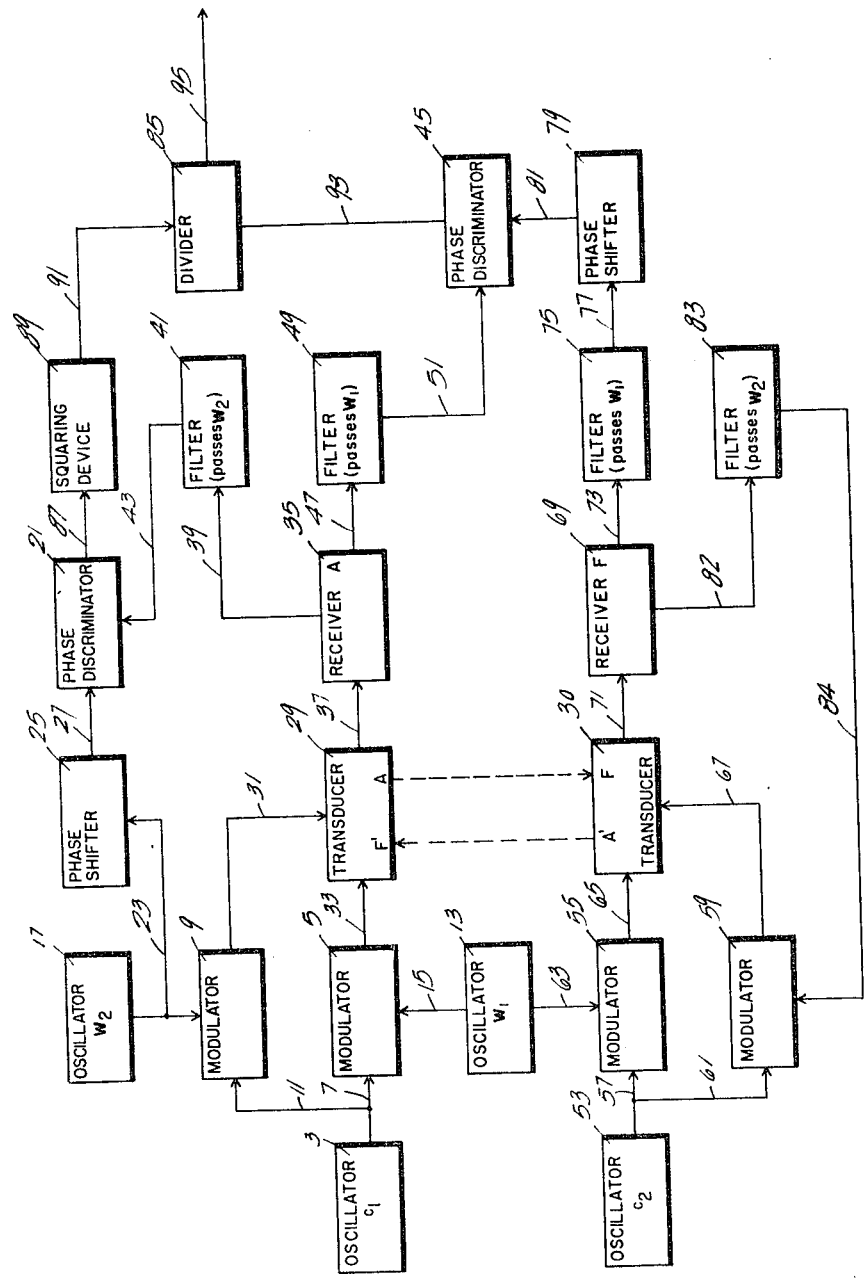

United States Patent Office 3,165,928
Patented Jan. 19, 1965

3,165,928
FLOW METER
Leo Poulos, Randallstown, Md., assignor, by mesne assignments, to the United States of America as represented by the Secretary of the Navy
Filed Feb. 14, 1963, Ser. No. 258,967
4 Claims. (Cl. 73—194)

The present invention relates to a novel and improved flow meter and more particularly to a novel and improved flow meter in which the measurement of flow is independent of the propagation velocity of the fluid medium.

Sound waves have been used in the past to provide an accurate measurement of the instantaneous flow rate of a fluid medium. This technique for the measurement of flow rate is subject to error in some applications, however, due to variations in the propagation velocity of the fluid medium which may occur when air bubbles are inadvertently or inavoidably introduced into the medium. Changes in temperature of the fluid medium also produce variations in the propagation velocity parameter of the medium and further reduce the accuracy of the flow rate measurement.

It is therefore a principal object of the present invention to provide a novel and improved sonic type flow meter which is relatively simple in design yet highly accurate in operation.

It is a further object of the invention to provide a novel and improved sonic type flow meter which does not require recalibration when the propagation velocity of the medium varies due to fluid density or temperature.

Other objects and many of the attendant advantages of this invention will be readily appreciated as the same becomes better understood by reference to the following detailed description when considered in connection with the accompanying drawing wherein FIG. 1 is a diagrammatic view of a preferred embodiment of the present invention.

As shown in FIG. 1, oscillator 3, which develops a first preselected high frequency carrier signal $C_1$, is coupled to modulator 5 through conductor 7 and to modulator 9 through conductor 11. Oscillator 13, which develops a first preselected sub-carrier signal $W_1$, is coupled to modulator 5 through conductor 15. Oscillator 17, which develops a second preselected sub-carrier signal $W_2$, is coupled to modulator 9 through conductor 19. Oscillator 17 is also coupled to one side of phase discriminator 21 through conductor 23, phase shift circuit 25 and conductor 27. Modulators 5 and 9 electrically energize one section of the double frequency transducer 29 through conductors 31 and 33. The signal received in transducer 29 is then converted to sound energy and is propagated along an acoustic path AF in the fluid medium to transducer 30 where the energy is reconverted into electrical energy. The structural details of the double frequency transducers 29 and 30, which by themselves form no part of the present invention, are preferably of a type similar to that described in the copending application entitled "A Double Frequency Transducer," Serial No. 179,497 filed March 13, 1962, now issued as U.S. Patent 3,109,112. The electrical output circuit of the transducer 29 is connected to the receiver 35 through conductor 37. One output circuit of receiver 35 is connected to phase discriminator 21 through conductor 39, filter 41, and conductor 43. The other output circuit of receiver 35 is connected to one side of the phase discriminator 45 through conductor 47, filter 49, and conductor 51. Oscillator 53, which develops a second preselected high frequency carrier signal $C_2$, is coupled to modulator 55 through conductor 57 and to modulator 59 through conductor 61. Oscillator 13 is coupled to modulator 55 through conductor 63. Modulators 55 and 59 electrically energize one section of the double frequency transducer 30 through conductors 65 and 67 and propagate energy along an acoustic path A'F' in the fluid medium between transducer 30 and transducer 29. The electrical output circuit of transducer 30 is connected to the receiver 69 through conductor 71. One output circuit of receiver 69 is connected to phase discriminator 45 through conductor 73, filter 75, conductor 77, phase shift circuit 79 and conductor 81. The other output circuit of receiver 69 is connected to modulator 59 through conductor 82, filter 83 and conductor 84. The output circuit of phase discriminator 21 is connected to one side of the divider circuit 85 through conductor 87, the squaring device 89 and conductor 91. The output circuit of phase discriminator 45 is connected to the other side of divider circuit 85 through conductor 93. The desired measurement of flow rate of the medium is obtained on the output line 95 of divider 85.

The details of the various component elements of the above described circuit are of conventional design and by themselves form no part of the invention. As will be more apparent hereinafter filter units 49 and 75 are designed to pass signals of frequency $W_1$ and exclude signals of frequency $W_2$ whereas filters 41 and 83 are designed to pass signals of frequency $W_2$ and exclude signals of frequency $W_1$.

In operation the selected high frequency carrier signal $C_1$ developed in oscillator 3 is modulated in modulator 5 by the sub-carrier signal $W_1$ which is developed in oscillator 13. The modulated carrier signal $C_1$ then electrically energizes one section of the double frequency transducer 29 and produces a sonic wave that propagates through the fluid medium from A to F. The sonic energy received at F in transducer 30 is then reconverted into electrical energy and is fed into the receiver 69 where the signal is demodulated and amplified. The demodulated signal $W_1$ is then directed through filter 75 and the phase shift adjusting circuit 79 to one side of the phase discriminator 45.

Similarly, the selected high frequency carrier signal $C_2$ developed in oscillator 53 is modulated in modulator 55 by the sub-carrier signal W, which is developed in oscillator 13. This modulated carrier signal $C_2$ then electrically energizes one section of transducer 30 and produces a sonic wave that propagates through the fluid medium from A' to F'. The sonic energy received at F' in transducer 29 is then reconverted into electrical energy and is fed into the receiver 35 where the signal is demodulated and amplified. This demodulated signal $W_1$ is then directed through filter 49 to the other side of the phase discriminator 45.

The phase shift between the two signals transmitted in opposite directions between transducers 29 and 30 detected in discriminator 45 provides a measure of the velocity or the flow rate of the medium between the two transducers. This may be readily noted by way of the following mathematical analysis. The phase shift $\phi_{AF}$ which the sub-carrier signal $W_1$ experiences in traveling from A to F is:

$$\phi_{AF} = W_1 T_{AF} \tag{1}$$

where $T_{AF}$ is the time required for the wave to travel from A to F. The time $T_{AF}$ required to travel through the fluid medium from A to F is:

$$T_{AF} = \frac{L}{C_m + V_{AF}} \tag{2}$$

where L is the distance between A and F, $C_m$ is the propagation velocity of the medium, and $V_{AF}$ is the velocity component of the medium between A and F.

Combining Equations 1 and 2, we find that the phase shift that sub-carrier signal $W_1$ experiences in traveling from A to F is:

$$\phi_{AF} = \frac{W_1 L}{C_m + V_{AF}} \quad (3)$$

Similarly, the phase shift $\phi_{A'F'}$ which the sub-carrier signal $W_1$ experiences in traveling through the medium in the opposite direction from A' to F' is:

$$\phi_{A'F'} = W_1 T_{A'F'} \quad (4)$$

The time $T_{A'F'}$ required to travel from A' to F' is:

$$T_{A'F'} = \frac{L}{C_m - V_{AF}} \quad (5)$$

Combining Equations 4 and 5, we find that:

$$\phi_{A'F'} = \frac{W_1 L}{C_m - V_{AF}} \quad (6)$$

The difference in phase shift $\phi_{DIFF}$ of the two sub-carrier signals in traveling through the medium in opposite directions is:

$$\phi_{DIFF} = \phi_{AF} - \phi_{A'F'} \quad (7)$$

Combining and simplifying Equations 3, 6 and 7 shows that:

$$\phi_{DIFF} = \frac{-2W_1 L V_{AF}}{C_m^2 - V_{AF}^2} \quad (8)$$

But since $C_m \gg V_{AF}^2$ $$\phi_{DIFF} \approx \frac{-2W_1 L V_{AF}}{C_m^2} \quad (9)$$

Transposing Equation 9:

$$V_{AF} \approx \frac{\phi_{DIFF} C_m^2}{-2W_1 L} \quad (9a)$$

Since the output voltage of the phase discriminator 45 is proportional to the phase difference of the input signals on conductors 51 and 81, $$v_1 = K_1 \phi_{DIFF} \quad (9b)$$

where $v_1$ is the output voltage of the phase discriminator and $K_1$ is the constant that converts radians of phase difference in the discriminator to output volts.

By combining Equations 9a and 9b $$V_{AF} \approx \frac{v_1 C_m^2}{-2K_1 W_1 L} \quad (10)$$

Thus, with $W_1$, $L$, $K_1$ and $C_m$ known, it is possible to determine $V_{AF}$ by measuring the voltage of the output signal of discriminator 45 on conductor 93.

As has been noted hereinabove, however, the propagation velocity of the medium may not at all times be constant. $C_m$ may change as temperature of the medium changes or it may change as the density of the medium changes. In order to provide a measure of the velocity component $V_{AF}$ of the medium which is also independent of the propagation velocity $C_m$ of the medium, the carrier signal $C_1$ developed in oscillator 3 is also modulated in modulator 9 by the sub-carrier $W_2$ which is developed in oscillator 17. This $W_2$ modulated carrier signal $C_2$ then also electrically energizes transducer 29 and produces a sonic wave that propagates through the fluid medium from A to F. This sonic energy received at F in transducer 30 is then reconverted into electrical energy and is fed into the receiver 69 where the signal is demodulated and amplified. The demodulated signal $W_2$ is then directed through filter 83 to modulator 59 where it modulates the carrier signal $C_2$ from oscillator 53. The resulting $W_2$ modulated carrier signal $C_2$ then electrically energizes transducer 30 and produces a sonic wave that propagates through the fluid medium from A' to F'. The sonic energy received at F' in transducer 29 is then reconverted into electrical energy and is fed into the receiver 35 where the signal is again demodulated and amplified. The demodulated signal $W_2$ is then directed through filter 41 to one side of the phase discriminator 21. The other side of phase discriminator 21 is driven directly by oscillator 17 through the phase shift adjusting circuit 25. The output signal of discriminator 21 which as will be more apparent hereinafter is proportional to the sum of the phase shifts experienced by signal $W_2$ in traveling from A to F and from A' to F' is squared in the squaring circuit 89 and fed into one side of the divider circuit 85. The other side of the divider 85 is driven by the voltage $v_1$ on conductor 93. The output signal of divider 85 on conductor 95 provides a measure of $V_{AF}$ which is independent of any variations in $C_m$ that may occur.

It will be noted that by introducing the second sub-carrier signal $W_2$ and propagating it through the medium first from A to F then from A' to F' the total phase shift or sum of the phase shifts $\theta_{SUM}$ experienced by signal $W_2$ in making the round trip path is:

$$\theta_{SUM} = \theta_{AF} + \theta_{A'F'} = W_2(T_{AF} + T_{A'F'}) \quad (11)$$

Combining and simplifying Equations 2, 5 and 11 we find that:

$$\theta_{SUM} = 2W_2 \frac{L}{C_m} \quad (12)$$

Thus, by comparing in discriminator 21 the successive phase shifts applied to signal $W_2$ during its transmission and return through the fluid medium with its reference pulse from oscillator 17 on conductor 27, a voltage $v_2$ proportional to $\theta_{SUM}$ is provided on conductor 87. Thus, $$v_2 = K_2 \theta_{SUM} = 2K_2 W_2 \frac{L}{C_m} \quad (13)$$

where $K_2$ is the constant that converts radians of phase difference in the phase discriminator 21 to output volts.

By squaring this voltage $v_2$ in the analogue type squaring device 89, we obtain:

$$v_2^2 \approx \frac{4K_2^2 W_2^2 L^2}{C_m^2} \quad (14)$$

By then combining Equations 9 and 9b and dividing $v_1$ by $v_2^2$, we obtain:

$$v_3 \approx \frac{v_1}{v_2^2} \approx \frac{K_3 W_1 V_{AF}}{W_2^2 L} \quad (15)$$

were $K_3$ is a constant.

By transposing Equation 15

$$V_{AF} \approx \frac{v_3 W_2^2 L}{K_3 W_1} \quad (16)$$

Thus, it will be noted that voltage $v_3$ on conductor 95 provides the desired direct measure of the velocity of the medium between transducers 29 and 30 and is independent of the propagation velocity constant $C_m$ of the medium.

Obviously many modifications and variations of the present invention are possible in the light of the above teachings. It is therefore to be understood that within the scope of the appended claims the invention may be practised otherwise than as specifically described.

What is claimed is:

1. Apparatus for measuring the flow of a fluid comprising:
   (a) first and second transducers located in the fluid at upstream and downstream positions relative to one another;
   (b) means for generating a first energy signal and transmitting said first energy signal from the first transducer to the second transducer;
   (c) means for generating a second energy signal and transmitting said second energy signal from the second transducer to the first transducer;
   (d) means for developing a potential proportional to the difference in phase of the first and second energy signals after transmission through the fluid;
   (e) means for transmitting a third energy signal from the first transducer to the second transducer back to the first transducer;

(f) means for developing a potential proportional to the sum of the phase shifts experienced by the third signal in traveling from the first transducer to the second transducer back to the first transducer;

(g) means for squaring the potential proportional to the sum of the phase shifts experienced by the third signal;

(h) and means for dividing the potential proportional to the phase difference between the first and second signals by the squared potential, the output of the dividing means providing a measure of the flow of the fluid.

2. Apparatus for measuring the flow of a fluid comprising:

(a) first and second transducers located in the fluid at upstream and downstream positions relative to one another;

(b) means for generating a first energy signal and transmitting said first energy signal from the first transducer to the second transducer;

(c) a first receiver coupled to the output of the second transducer;

(d) means for generating a second energy signal and transmitting said second energy signal from the second transducer to the first transducer;

(e) a second receiver coupled to the output of the first transducer;

(f) means for developing a potential proportional to the difference in phase between the output signals of the first and the second receivers;

(g) means for transmitting a third energy signal from the first transducer to the second transducer back to the first transducer;

(h) means for developing a potential proportional to the sum of the phase shifts experienced by the third signal in traveling from the first transducer to the second transducer back to the first transducer;

(i) means for squaring the potential proportional to the sum of the phase shifts experienced by the third signal;

(j) and means for dividing the potential proportional to the phase difference between the output signals of the first and second receivers by the output potential of the squaring means, the output of the dividing means providing a measure of the flow of the fluid.

3. Apparatus for measuring the flow of a fluid comprising:

(a) first and second transducers located in the fluid at upstream and downstream positions relative to one another;

(b) means for generating a first energy signal and transmitting said first energy signal from the first transducer to the second transducer;

(c) means for generating second energy signal and transmitting said second energy signal from the second transducer to the first transducer;

(d) means for developing a potential proportional to the difference in phase of the first and second energy signals after transmission through the fluid;

(e) means for transmitting a third energy signal from the first transducer to the second transducer back to the first transducer;

(f) a phase discriminator;

(g) means for comparing the phase of the third signal prior to and after its transmission through the fluid in the phase discriminator;

(h) means for squaring the phase comparison output signal of the phase discriminator;

(i) and means for dividing the potential proportional to the phase difference between the said first and second signals by the squared potential, the output of the dividing means providing a measure of the flow of the fluid.

4. Apparatus for measuring the flow of a fluid comprising:

(a) first and second transducers located in the fluid at upstream and downstream positions relative to one another;

(b) means for generating a first energy signal and transmitting said first energy signal from the first transducer to the second transducer;

(c) a first receiver coupled to the output of the second transducer;

(d) means for transmitting a second energy signal and transmitting said second energy signal from the second transducer to the first transducer;

(e) a second receiver coupled to the output of the first transducer;

(f) a first phase discriminator coupled to the outputs of the first and second receivers;

(g) means for transmitting a third energy signal from the first transducer to the second transducer back to the first transducer;

(h) a second phase discriminator (i) means for comparing the phase of the third signal prior to and after its transmission through the fluid in the second phase discriminator;

(j) a squaring device coupled to the output of the second phase discriminator;

(k) and a dividing network coupled to the output of the squaring device and the first phase discriminator, the output of the dividing network providing a measure of the flow of the fluid.

References Cited by the Examiner

UNITED STATES PATENTS

| | | | |
|---|---|---|---|
| 2,534,712 | 12/50 | Gray | 73—194 |
| 2,826,912 | 3/58 | Kritz | 73—194 |
| 2,949,772 | 8/60 | Kritz | 73—194 |
| 2,949,773 | 8/60 | Batchelder | 73—194 |
| 3,109,112 | 10/63 | Lester | 73—194 X |

FOREIGN PATENTS

| | | |
|---|---|---|
| 623,022 | 5/49 | Great Britain. |

RICHARD C. QUEISSER, *Primary Examiner.*

DAVID SCHONBERG, *Examiner.*